US011558295B2

(12) United States Patent
Nainar et al.

(10) Patent No.: US 11,558,295 B2
(45) Date of Patent: Jan. 17, 2023

(54) FORWARDING TABLE VALIDATION

(71) Applicant: Cisco Technology, Inc., San Jose, CA (US)

(72) Inventors: Nagendra Kumar Nainar, Morrisville, NC (US); Carlos M. Pignataro, Cary, NC (US); Zafar Ali, Hicksville, NY (US); Syed Kamran Raza, Kanata (CA)

(73) Assignee: Cisco Technology, Inc., San Jose, CA (US)

( * ) Notice: Subject to any disclaimer, the term of this patent is extended or adjusted under 35 U.S.C. 154(b) by 125 days.

(21) Appl. No.: 17/115,451

(22) Filed: Dec. 8, 2020

(65) Prior Publication Data

US 2022/0182322 A1 Jun. 9, 2022

(51) Int. Cl.
*H04L 45/74* (2022.01)
*H04L 45/745* (2022.01)
*H04L 43/12* (2022.01)

(52) U.S. Cl.
CPC ............ *H04L 45/745* (2013.01); *H04L 43/12* (2013.01)

(58) Field of Classification Search
CPC .............................. H04L 45/745; H04L 43/12
See application file for complete search history.

(56) References Cited

U.S. PATENT DOCUMENTS

| 7,283,563 | B1* | 10/2007 | Allan | H04L 67/1095 |
| | | | | 709/228 |
| 2011/0211579 | A1* | 9/2011 | Cao | H04L 45/507 |
| | | | | 370/392 |
| 2013/0286846 | A1* | 10/2013 | Atlas | H04L 47/726 |
| | | | | 370/235 |
| 2014/0198791 | A1 | 7/2014 | Lim | |
| 2014/0280834 | A1* | 9/2014 | Medved | H04L 41/0609 |
| | | | | 709/223 |
| 2015/0381444 | A1 | 12/2015 | Nainar et al. | |
| 2017/0054626 | A1 | 2/2017 | Sivabalan et al. | |
| 2018/0359176 | A1* | 12/2018 | Nainar | H04L 45/22 |
| 2018/0375770 | A1 | 12/2018 | Li et al. | |

FOREIGN PATENT DOCUMENTS

JP         2007151013         6/2007

* cited by examiner

*Primary Examiner* — Brenda H Pham
(74) *Attorney, Agent, or Firm* — Polsinelli

(57) ABSTRACT

The present disclosure includes methods, systems, and non-transitory computer-readable media for validating data in a data structure used for forwarding packets by a network device comprising sending a data packet probe identifying a destination and including a segment ID, wherein the segment ID maps to a first interpretation by a receiving router to perform an action on the data packet probe to rewrite a portion of a destination address in a header of the data packet probe, and to redirect the data packet probe to the network device that initiated the data packet probe.

14 Claims, 7 Drawing Sheets

FORWARDING TABLE VALIDATION

TECHNICAL FIELD

The subject matter of this disclosure relates in general to validating packet forwarding data in a networking environment, and specifically to validating forwarding data in a data structure used to forward packets by a network device in the networking environment.

BACKGROUND

Management of networking environments without the interference of the control plane is an increasingly desirable feature of enterprise operations. With software-defined networks (SDNs), new tools make management without control plane interference more readily attainable, whether through centralized or distributed management. One area where demand is present but supply is lacking involves operations, administration, and maintenance (OAM) of path monitoring. Path monitoring often requires the use of control plane intervention for validation of equal-cost multi-path (ECMP) routing. Another area involves the validation of next hop nodes along a path, or other attributes of path monitoring. The current state of network management does not minimize control plane involvement, and furthermore does not allow such management to take place in the data plane.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1A:
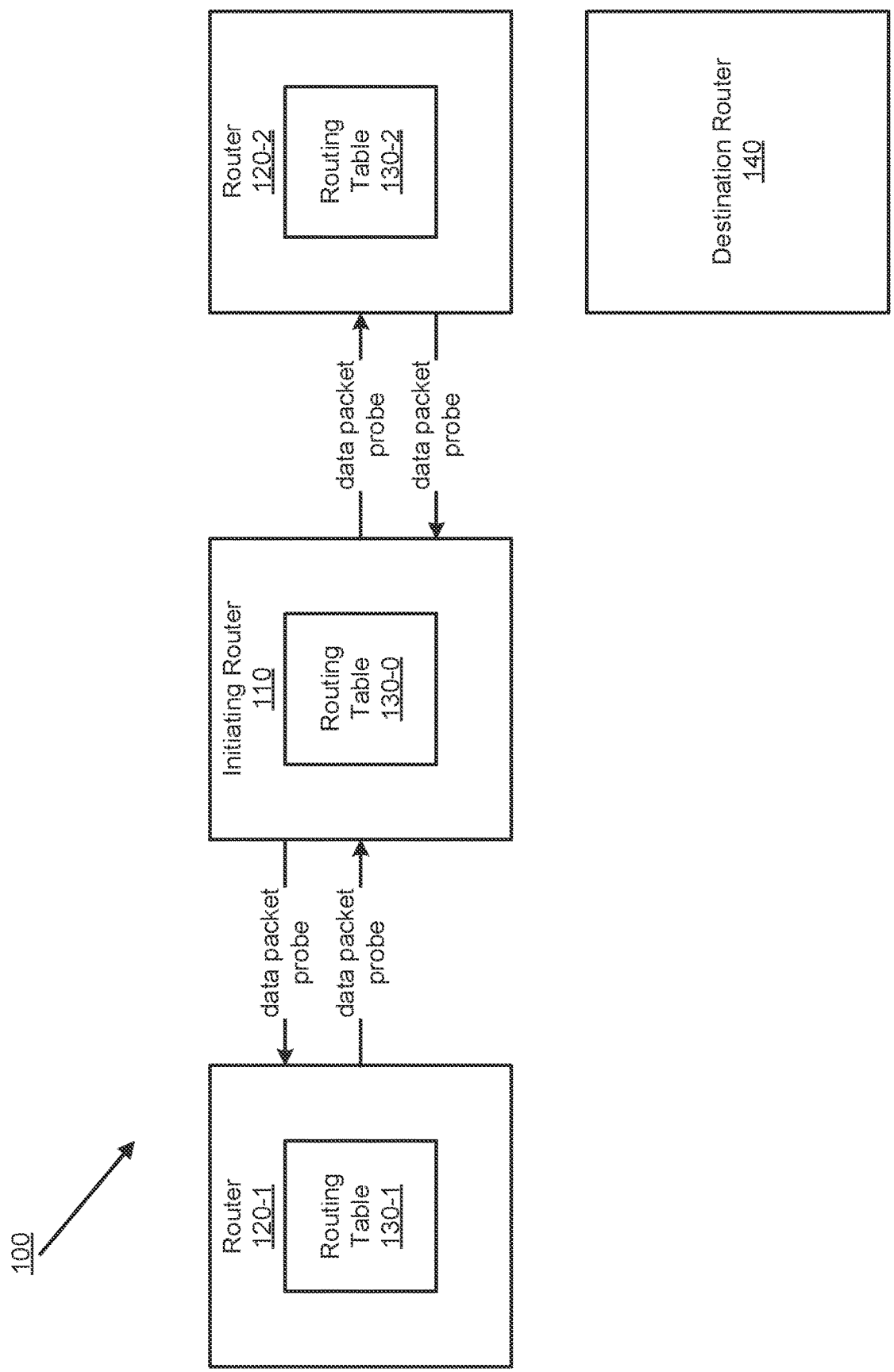
FIGS. 1A and 1B show examples of networking environments 100 and 150, respectively, in accordance with some embodiments of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Claim language reciting "at least one of" a set indicates that one member of the set or multiple members of the set satisfy the claim. For example, claim language reciting "at least one of A and B" means A, B, or A and B.

OVERVIEW

Disclosed herein are methods, systems, and non-transitory computer-readable media relating to management of network environments with minimal interference from the control plane. Specifically, the disclosed technology relates to the validation of aspects of forwarding tables, data structures, or other information schemes used in path forwarding in network environments through the use of data packet probes.

A method can include sending a data packet probe identifying a destination and including a segment ID, wherein the segment ID maps to a first interpretation by a receiving router to perform an action on the data packet probe to rewrite a portion of a destination address in a header of the data packet probe, and to redirect the data packet probe to a network device that initiated the data packet probe.

In some embodiments of the method, the segment ID is an embedded segment ID, wherein the embedded segment ID is a portion of the destination address which maps to a semantic meaning in a data structure used for forwarding packets by the receiving router.

In some embodiments of the method, the embedded segment ID can include a plurality of nested embedded segment IDs, wherein each of the plurality of nested embedded segment IDs is to be interpreted by at least one router along a forwarding path to the destination, and wherein at least one of the plurality of nested embedded segment IDs maps to a second interpretation that is different than the first interpretation for another of the plurality of nested embedded segment IDs.

In some embodiments of the method, the second interpretation of the at least one of the plurality of nested embedded segment IDs instructs a first router to remove a first one of the plurality of nested embedded segment IDs and use a specified byte range located in the destination address in the header of the data packet probe to forward the data packet probe, and to rewrite the destination address in the header of the data packet probe without the first one of the plurality of nested embedded segment IDs and without the specified byte range.

In some embodiments of the method, the embedded segment ID is a loopback segment ID, which maps to the first interpretation by the receiving router to rewrite a portion of the destination address in the header of the data packet probe, and to redirect the data packet probe to its source using an interface from which the data packet probe was received, wherein the source is a router from which the data packet probe was directly received.

In some embodiments of the method, the network device is an initiating router, and wherein the data structure is a routing table for the initiating router, wherein the embedded segment ID can include a plurality of nested embedded segment IDs where each of the plurality of nested embedded segment IDs pertains to information derived from the routing table for the initiating router, wherein the loopback segment ID is used to validate a prefix in the routing table.

In some embodiments of the method, the initiating router is the network device that initiates the data packet probe to validate data in the routing table for the initiating router.

In some embodiments of the method, the prefix is validated because the prefix was used by the initiating router to forward the data packet probe toward a destination prefix, and the data packet probe was returned to the initiating router from a router that is on a path to the destination address that is downstream from the initiating router, which serves as a confirmation that the routing table correctly indicated a proper downstream router on the path to the destination address.

In some embodiments of the method, the network device is an initiating router, and wherein the data structure is a routing table for the initiating router, wherein the embedded segment ID can include a plurality of nested embedded segment IDs where each of the plurality of nested embedded segment IDs pertains to information derived from the routing table for the initiating router, wherein the loopback segment ID is used to validate a next hop in the routing table.

In some embodiments of the method, the next hop in the routing table is validated because the data packed probe was returned by the next hop indicated in the routing table and was received on an interface that the initiating router used to forward the data packet probe to the next hop.

In some embodiments of the method, the network device is an OAM server, and wherein the data structure is an ECMP path forwarding table, wherein the data packet probe identifies the destination and a forwarding path, and wherein the first interpretation further causes the receiving router to determine if the forwarding path is a valid forwarding path to the destination, and when the forwarding path is a valid forwarding path to the destination, redirect the data packet probe over the forwarding path and to the OAM server, else drop the data packet probe.

A system can include a storage configured to store instructions and a processor configured to execute the instructions and cause the processor to send a data packet probe identifying a destination and including a segment ID, wherein the segment ID maps to a first interpretation by a receiving router to perform an action on the data packet probe to rewrite a portion of a destination address in a header of the data packet probe, and to redirect the data packet probe to the network device that initiated the data packet probe.

A non-transitory computer-readable medium can include instructions which, when executed by a computing system, cause the computing system to send a data packet probe identifying a destination and including a segment ID, wherein the segment ID maps to a first interpretation by a receiving router to perform an action on the data packet probe to rewrite a portion of a destination address in a header of the data packet probe, and to redirect the data packet probe to the network device that initiated the data packet probe.

DESCRIPTION OF EXAMPLE EMBODIMENTS

Disclosed herein are methods, systems, and non-transitory computer-readable media for validating packet forwarding in a networking environment, and specifically for validating forwarding data in a data structure used to forward packets by a network device in the networking environment. The present disclosure allows for this to occur without management or interference by the control plane under the control of a network controller.

FIG. 1A illustrates an example networking environment 100 which can implement aspects of the present technology. In networking environment 100, initiating router 110 can validate entries in its routing table 130-0 without any control plane involvement on other routers.

Initiating router 110 can validate entries in its routing table 130-0 by forwarding a data packet probe with a destination address encoded in the header of the data packet probe. The destination address can include information about the final destination of the path, such as destination router 140, as well as information about the route the path is taking. The data packet probe can be configured to cause another router to send information back to initiating router 110 to validate entries in routing table 130-0, such as the next hop address of the path to destination router 140. The mechanism by which the validation can occur is through the use of segment IDs (SIDs), which are strings of characters embedded in the destination address and which can point to entries in any of routing tables 130. In some embodiments, a segment ID can reference software instructions to be carried out by a router.

In some embodiments, validation of an aspect of the path can occur by validating a prefix SID, which can correspond to the destination of the path. In some embodiments, validation of an aspect of the path can occur by validating an adjacency SID, which can correspond to the next hop address in the path to the destination that occurs after the initiating router 110. Networking environment 100 can be used to validate either, or both, of these SID types for initiating router 110.

As an example, suppose initiating router 110 wants to validate an adjacency SID "C1102" for initiating router 110 along a path to destination router 140 in routing table 130-0, where a seSID is a SID-embedded SID. A seSID can prescribe an action for the router to take, which can involve manipulating the destination address in a certain way. See below for an in-depth example of how seSIDs can be handled. Presently, consider routing table 130-0:

| Routing Table 130-0 | |
|---|---|
| SID | Next Hop |
| C1102 | Router 120-2 |
| D0 | seSID |
| A140 | Router 120-2 |

The validation of adjacency ID C1102 indicates that router 120-2 is the next hop router, relative to the initiating router, on a valid path to destination router 140. To validate this fact using a data packet probe, a header is created which allows the data packet probe to be appropriately forwarded through networking environment 100. In some embodiments, the destination address can take the following form: <C12010:D0:C1102:B0:A110>. The destination address uses entries in routing tables 130-0, 130-1, and 130-2 to appropriately forward and validate the prefix SID.

In the example above, routing tables 130-1 and 130-2 can be laid out as follows:

| Routing Table 130-1 | |
|---|---|
| SID | Next Hop |
| C12010 | Initiating Router 110 |
| A110 | Initiating Router 110 |

| Routing Table 130-2 | |
|---|---|
| SID | Next Hop |
| B0 | loSID |
| A110 | Initiating Router 110 |

Progressively, the destination address can be altered when it is received by another router 120, or when a SID in the destination address mandates an action be made to the destination address. The destination address given above can proceed with the data packet probe through networking environment as follows:

Router 120-1 can receive the data packet probe from initiating router 110. From the first entry in the destination address (C12010), routing table 130-1 prescribes that the next hop is initiating router 110. Router 120-1 can pop the first entry in the destination address (C12010) and forward the data packet probe with the updated destination address in the header (<D0:C1102:B0:A110>) to initiating router 110.

Initiating router 110 can receive the data packet probe from router 120-1. From the first entry in the destination address (D0), routing table 130-0 recognizes an seSID. To utilize the seSID, initiating router 110 can pop the first and second entries comprising 32 bits, and utilize the second entry (C1102) for lookup in routing table 130-0. Initiating router 110 can forward the data packet probe with the updated destination address in the header (<B0:A110>) to router 120-2.

Router 120-2 can receive the data packet probe from initiating router 110. From the first entry in the destination address (B0), routing table 130-2 recognizes a loopback SID (loSID). To utilize the loSID, router 120-2 can pop the first entry (B0), which comprises 32 bits, and use the second entry (A110) for lookup in routing table 130-2. As this is the last entry in the destination address, it corresponds to the final destination of the data packet probe, which corresponds to initiating router 110. Router 120-2 can forward the data packet probe back to initiating router 110 using the same interface it received the data packet probe from.

The final reception of the data packet probe by initiating router 110 validates the adjacency SID in routing table 130-0.

A similar process can be followed to validate a prefix SID, such as A140, which corresponds to destination router 140. However, while an adjacency SID validates that a node in networking environment 100 is adjacent to initiating router 110, a prefix ID validates that a node in networking environment 100 is on a path to a destination, such as destination router 140.

Figure 1B:
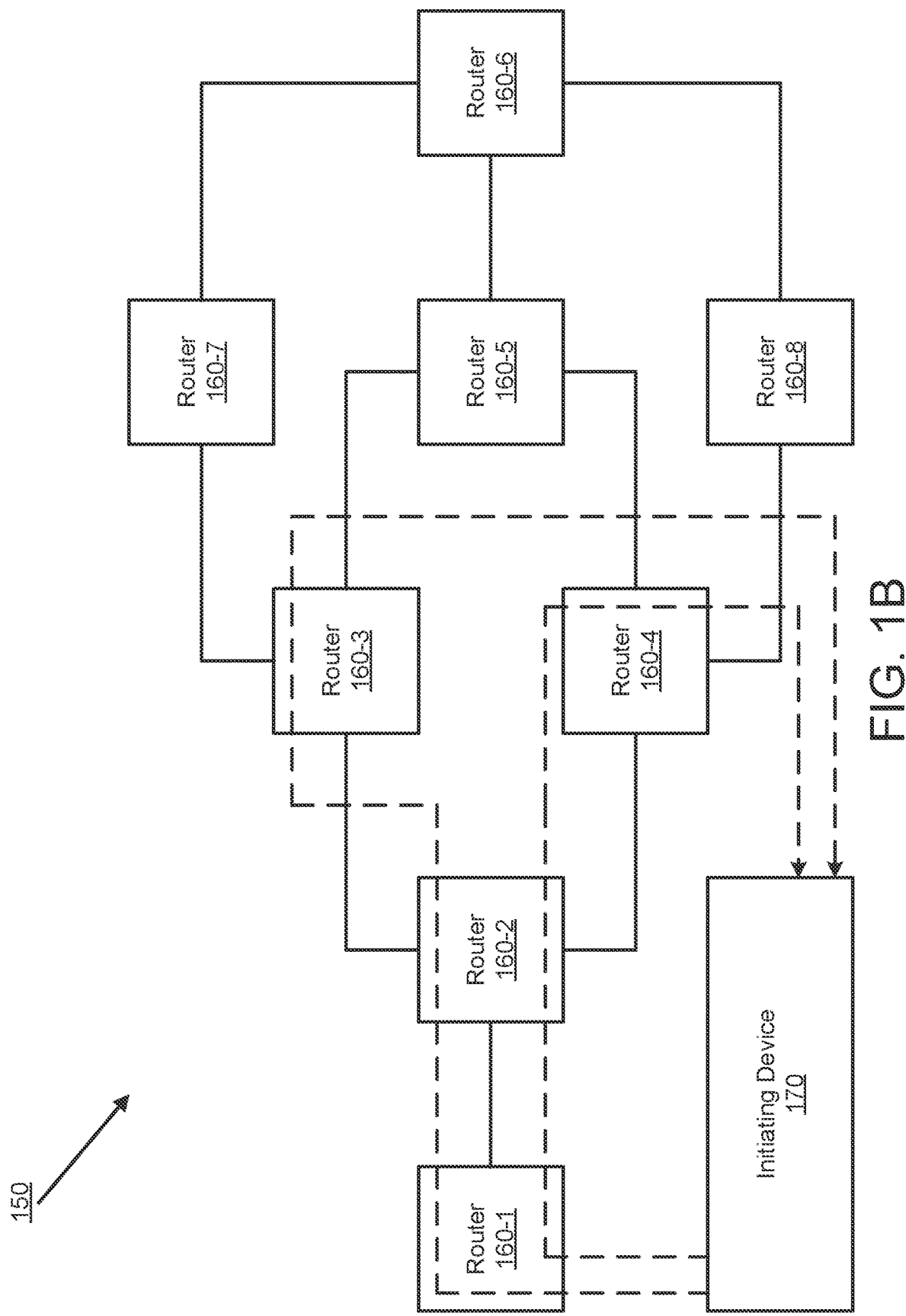

FIG. 1B illustrates an example networking environment 150 which can implement aspects of the present technology. In networking environment 150, initiating device 170 can validate equal-cost multi-path (ECMP) routing paths with queries.

Similar to the system described in FIG. 1A, networking environment 150 can utilize SIDs to validate ECMP paths. Prefix-embedded adjacency SIDs can be used to validate ECMP paths. The adjacency SID is used to identify the egress interface of a router 160, while the prefix SID is used to forward a data packet probe if the egress interface is an ECMP interface for the prefix SID. In a header of the data packet probe, the destination address can take the following form: < . . . signifier:adjacency SID:prefix SID: . . . >, where the signifier indicates that a prefix-embedded adjacency SID is present. In some embodiments, the signifier can be a micro SID (uSID).

This information can be embedded in routing tables for any of routers 160 in networking environment 150. For example, consider a routing table for router 160-2:

| Routing Table for Router 160-2 | | |
|---|---|---|
| SID | Action | Next Hop |
| uSID:C23:A6::/64 | Copy bits 63-127 to 32-111 | Router 160-3 |
| uSID:C24:A6::/64 | Copy bits 63-127 to 32-111 | Router 160-4 |
| uSID:C23:A5::/64 | Copy bits 63-127 to 32-111 | Router 160-3 |
| uSID:C24:A5::/64 | Copy bits 63-127 to 32-111 | Router 160-4 |

-continued

| Routing Table for Router 160-2 | | |
|---|---|---|
| SID | Action | Next Hop |
| uSID:C23:Ax:/48 | Drop | Null |
| uSID:C24:Ax:/48 | Drop | Null |

The bit-copying action in the above table is equivalent to popping the micro SID and the prefix-embedded adjacency SID from the destination address in the header of a data packet probe. The drop action in the above table drops the packet because the prefix SID does not match the adjacency SID. Each router 160 can have a routing table similar to the one above, though modified for particular adjacencies and paths relevant to the individual router.

As an example, initiating device 170 is an OAM server that would like to validate ECMP paths from router 160-2 towards router 160-6. It can identify that there are two ECMP paths from router 160-2 towards router 160-6: one going through router 160-3 and the other going through router 160-4. A destination address going through router 160-3 could take the form < . . . :C23:A6:A170>. The adjacency SID C23 reflects that router 160-3 is one hop from router 160-2. The prefix SID A6 reflects the endpoint of the path being validated, router 160-6. The final SID, A170, reflects initiating device 170, the ultimate destination of this data packet probe.

As illustrated in the above destination address, these data packet probes can return to the initiating device once they have confirmed the validity of a prefix-embedded adjacency SID. A destination address can validate path table entries for one or multiple devices on a given path.

Figure 2:
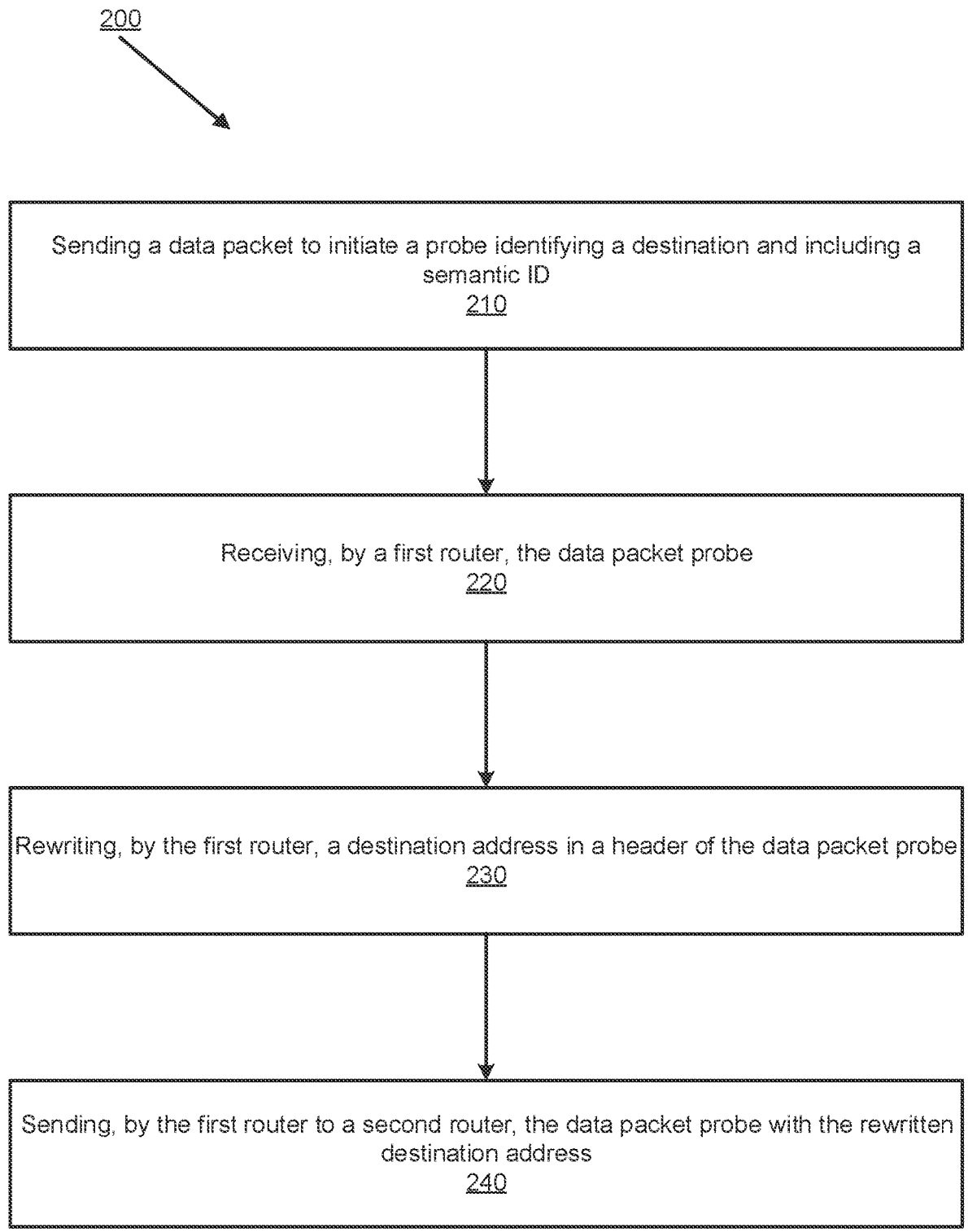
FIG. 2 is a flowchart of a method in accordance with some embodiments of the present technology.

FIG. 2 illustrates an example method 200 which can be carried out by the system illustrated in FIG. 1A. Although the example method 200 depicts a particular sequence of operations, the sequence may be altered without departing from the scope of the present disclosure. For example, some of the operations depicted may be performed in parallel or in a different sequence that does not materially affect the function of the method 200. In other examples, different components of an example device or system that implements the method 200 may perform functions at substantially the same time or in a specific sequence.

In some embodiments, the method includes sending a data packet to initiate a probe identifying a destination and including a segment ID at step 210. For example, initiating router 110 may send a data packet to initiate a probe identifying a destination and including a segment ID. The embedded segment ID is a portion of the destination address which maps to a semantic meaning in a data structure used for forwarding packets by the router.

The segment ID maps to a first interpretation by a first router, such as router 120-2, to perform an action on the data packet probe to rewrite a portion of a destination address in a header of the data packet probe, and to redirect the data packet probe to the network device that initiated the probe.

The segment ID can include a plurality of nested segment IDs. Each of the plurality of nested segment IDs is to be interpreted by at least one router along a forwarding path to the destination. The segment IDs can map to different interpretations. For example, a first meaning of a segment ID can be to forward the probe to a next destination. At least one of the plurality of nested segment IDs can map to a second interpretation that is different than the first interpretation for another of the plurality of the nested segment IDs. The second interpretation of the plurality of nested embedded segment IDs can instruct a first router, such as router 120-1, to remove the first one of the plurality of the nested embedded segment IDs and use a specified byte range located in the destination address portion of the header to forward the data packet probe, and to rewrite the destination address in the header of the data packet probe without the first one of the plurality of nested embedded segment IDs and without the specified byte range.

In some embodiments, the method includes receiving, by a first router, the data packet probe at step 220. For example, router 120-1 illustrated in FIG. 1A may receive the data packet probe.

In some embodiments, the method includes rewriting, by the first router, the destination address in the header of the data packet probe at step 230. For example, router 120-1 may rewrite the destination address in the header of the data packet probe.

In some embodiments, the method includes sending, by the first router to a second router, the data packet probe with the rewritten destination address at step 240. For example, router 120-1 may send the data packet probe to initiating router 110 or router 120-2 with the rewritten destination address.

Figure 3:
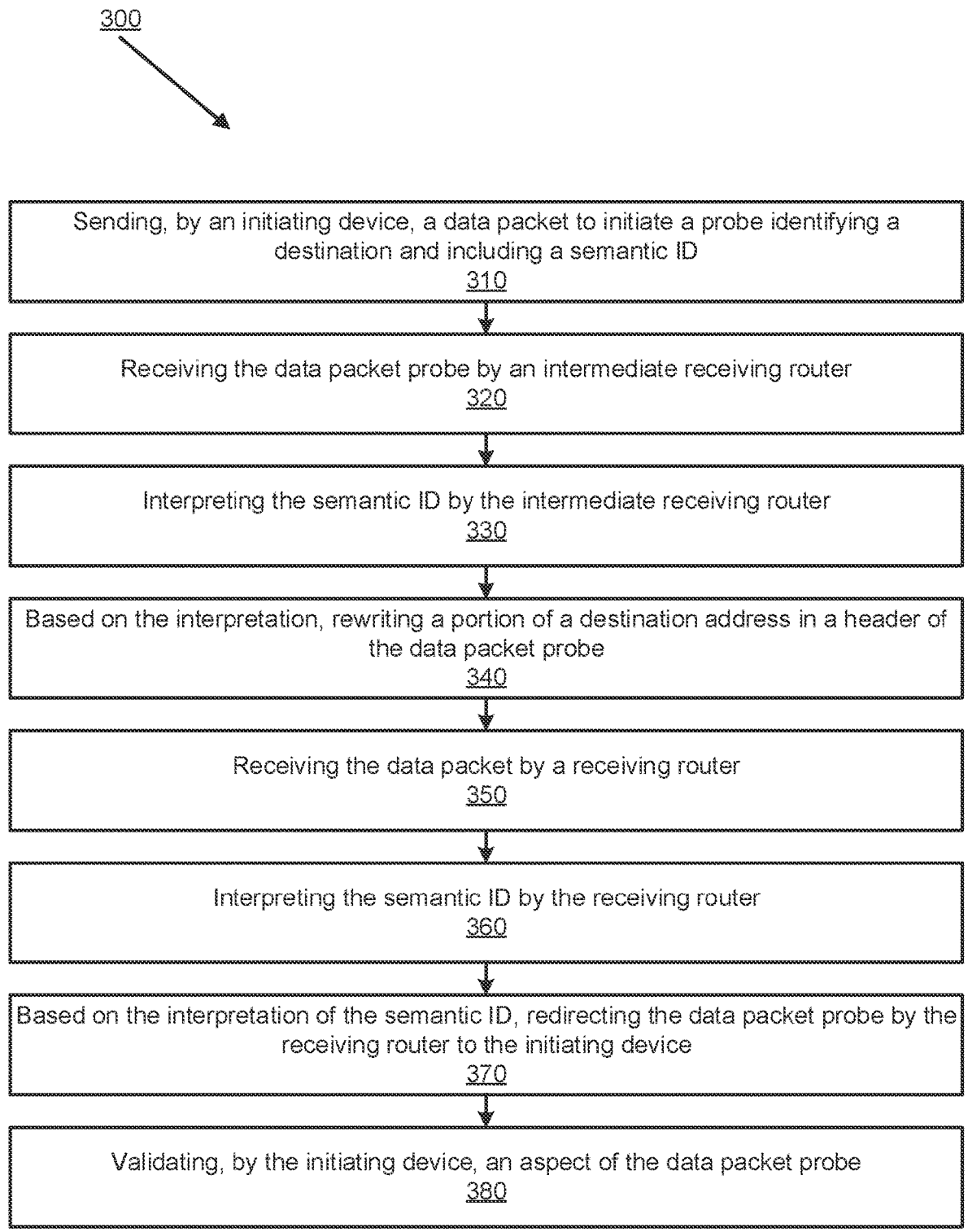
FIG. 3 is a flowchart of a method in accordance with some embodiments of the present technology.

FIG. 3 illustrates an example method 300 which can be carried about by the system illustrated in FIG. 1A. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

In some embodiments, the method includes sending, by the initiating router, a data packet to initiate a probe identifying a destination and including a segment ID at step 310. For example, initiating router 110 may send a data packet to initiate a probe identifying a destination and including a segment ID. The embedded segment ID is a portion of the destination address which maps to a semantic meaning in the data structure used for forwarding packets by the router. The segment ID maps to a first interpretation by a receiving router to perform an action on the data packet probe to rewrite a portion of a destination address in a header of the data packet probe, and to redirect the data packet probe to the network device that initiated the probe.

In some embodiments, the method includes receiving the data packet probe by an intermediate receiving router at step 320. For example, router 120-1 may receive the data packet probe. The method includes interpreting the segment ID by the intermediate receiving router at step 330. For example, router 120-1 may interpret the segment ID.

In some embodiments, router 120-1 may, based on the interpretation, rewrite the portion of the destination address in a header of the data packet probe at step 340. In an example, based on the interpretation of the segment ID in the header of the data packet, the intermediate receiving router may redirect the data packet probe to the next router in a path to the destination.

In some embodiments, the method includes receiving the data packet by a receiving router at step 350. For example, router 120-2 may receive the data packet after passing back through initiating router 110.

In some embodiments, the method includes interpreting the segment ID in the data packet by the receiving router data packet at step 360. For example, intermediate router 120-2 may interpret the segment ID in the data packet. In a first example, the segment ID can be interpreted using a routing table, such as routing table 130-2. In a second example, the segment ID can include a plurality of nested embedded segment IDs wherein each of the nested embedded segment IDs pertains to information derived from the routing table for the initiating router. For instance, each nested embedded segment ID can be listed in routing table 130-2 for router 120-2, and can be interpreted according to routing table 130-2. A third example can include, based on the interpretation of the segment ID in the data packet, rewriting, by the receiving router, a portion of a destination address in a header of the data packet probe.

In some embodiments, the method includes, based on the interpretation of the segment ID in the data packet, redirecting the data packet probe by the receiving router to the network device that initiated the probe at step 370. For example, router 120-2 may, based on the interpretation of the segment ID in the data packet, redirect the data packet probe to initiating router 110.

In one example, the segment ID can be a loopback segment ID, which maps to a first interpretation by the receiving router to rewrite a portion of a destination address in a header of the data packet probe, and to redirect the data packet probe to its source using the same interface from which the data packet probe was received.

In some embodiments, the method includes validating, by the initiating device, an aspect of the data packet probe at step 380. For example, initiating router 110 may validate an aspect of the data packet probe. In a first example, a prefix SID can be validated because the prefix SID was used by the initiating router to forward the data packet probe toward the destination prefix, and the data packet probe was returned to the initiating router from a router that is on a path to the destination address that is downstream from the initiating router which serves as a confirmation that the routing table correctly indicated a proper downstream router on the path to the destination address. For example, initiating router 110 can forward the data packet probe to router 120-2 as part of path to destination router 140, and then router 120-2 can forward the data packet probe pack to initiating router 110.

Figure 4:
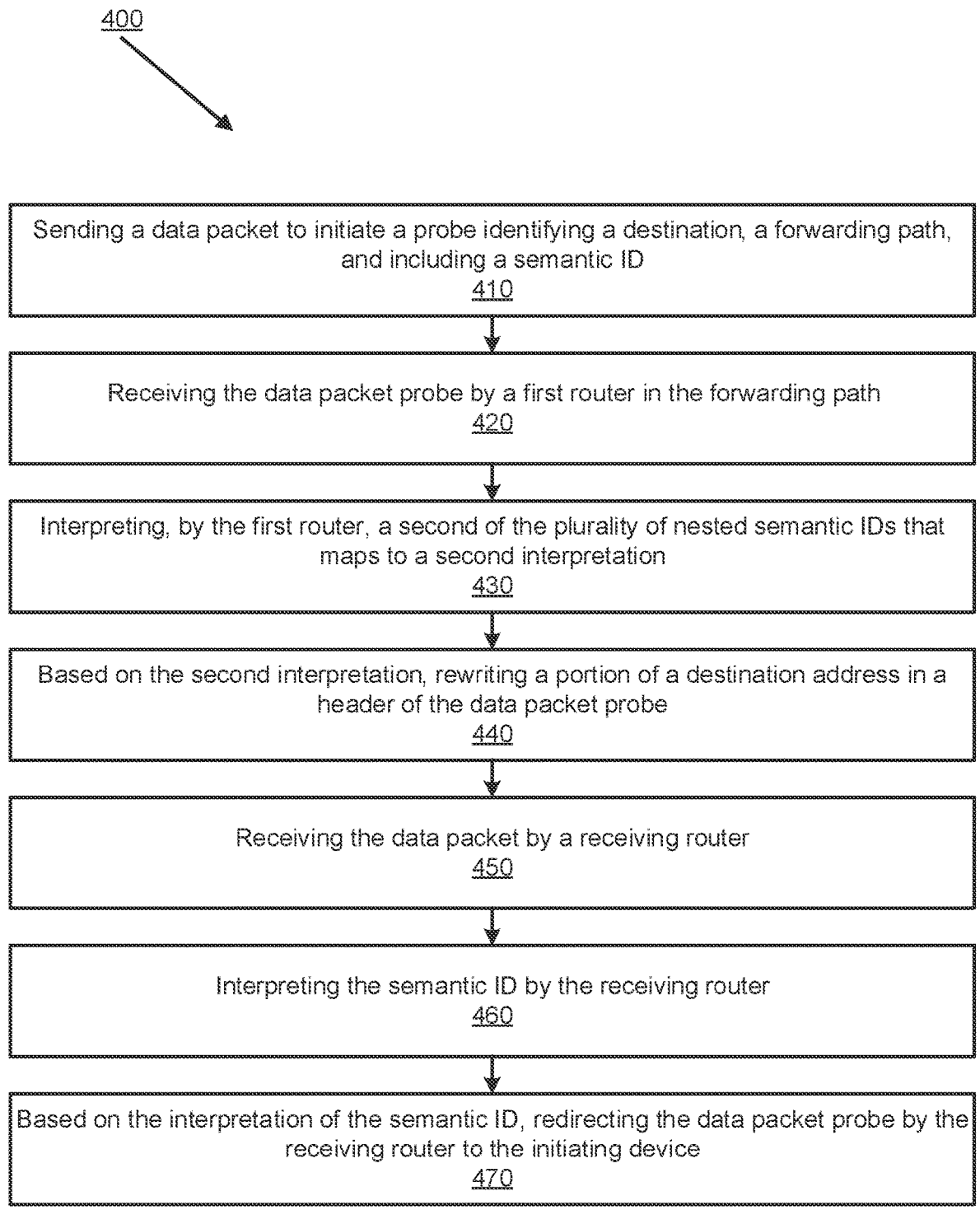
FIG. 4 is a flowchart of a method in accordance with some embodiments of the present technology.

FIG. 4 illustrates an example method 400 which can be carried out by the system illustrated in FIG. 1B. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

In some embodiments, the method includes sending a data packet to initiate a probe identifying a destination, a forwarding path, and including a segment ID at step 410. For example initiating device 170 may send a data packet to initiate a probe identifying a destination, a forwarding path, and including a segment ID. In a first example, the segment ID maps to a first interpretation by a receiving router to perform an action on the data packet probe to rewrite a portion of a destination address in a header of the data packet probe, and to redirect the data packet probe to the initiating device, which can be an OAM server. In a second example, the embedded segment ID is a portion of the destination address which maps to a semantic meaning in the data structure used for forwarding packets by the router. In a third example, wherein the embedded segment ID consists of a plurality of nested segment IDs, at least one of the plurality of nested segment IDs maps to a second interpretation that is different than the first interpretation for another of the plurality of the nested segment IDs. In a fourth example, each of the plurality of nested segment IDs is to be interpreted by at least one router along a forwarding path to the destination.

In some embodiments, the method includes receiving the data packet probe by a first router in a forwarding path at step 420. For example, router 160-1 may receive the data packet probe in a forwarding path.

In some embodiments, the method includes interpreting, by the first router, a second of the plurality of the nested sematic IDs that maps to the second interpretation at step 430. For example, router 160-1 may interpret the second of the plurality of the nested semantic IDs that maps to the second interpretation. In a first example, the second interpretation instructs the router in the forwarding path to remove the second one of the plurality of the nested segment IDs and use a specified byte range located in the destination address portion of the header to forward the data packet probe to along the forwarding path to the destination address.

In some embodiments, the method includes, based on the second interpretation, rewriting, by the first router, the destination address in the header of the data packet probe without the second one of the plurality of nested embedded segment IDs and without the specified byte range, but leaving the remaining nested segment IDs in the destination address of the header at step 440. For example, router 160-1 may, based on the second interpretation, rewrite the destination address in the header of the data packet probe without the second one of the plurality of nested embedded segment IDs and without the specified byte range, but leave the remaining nested segment IDs in the destination address of the header.

In some embodiments, the method includes receiving the data packet probe by a receiving router at step 450. For example, router 160-3 may receive the data packet probe.

In some embodiments, the method includes, based on the first interpretation, interpreting the segment ID by the receiving router. In a first example, this includes determining that the forwarding path is a valid forwarding path to the destination at step 460. For example, router 160-3 may, based on the first interpretation, determine by the receive router that the forwarding path is a valid forwarding path to the destination.

In some embodiments, the method includes, based on the interpretation of the segment ID, redirecting the data packet probe by the receiving router to the initiating device at step 470. For example, router 160-3 redirect the data packet probe over the forward path and to initiating device 170, which in some embodiments can be an OAM server. In a first example, when the path is a valid forwarding path, the receiving router may redirect the data packet probe over the forwarding path and to the OAM server by the receiving router. In a second example, when the path is not a valid forwarding path, the receiving router may drop the data packet probe.

Figure 5:
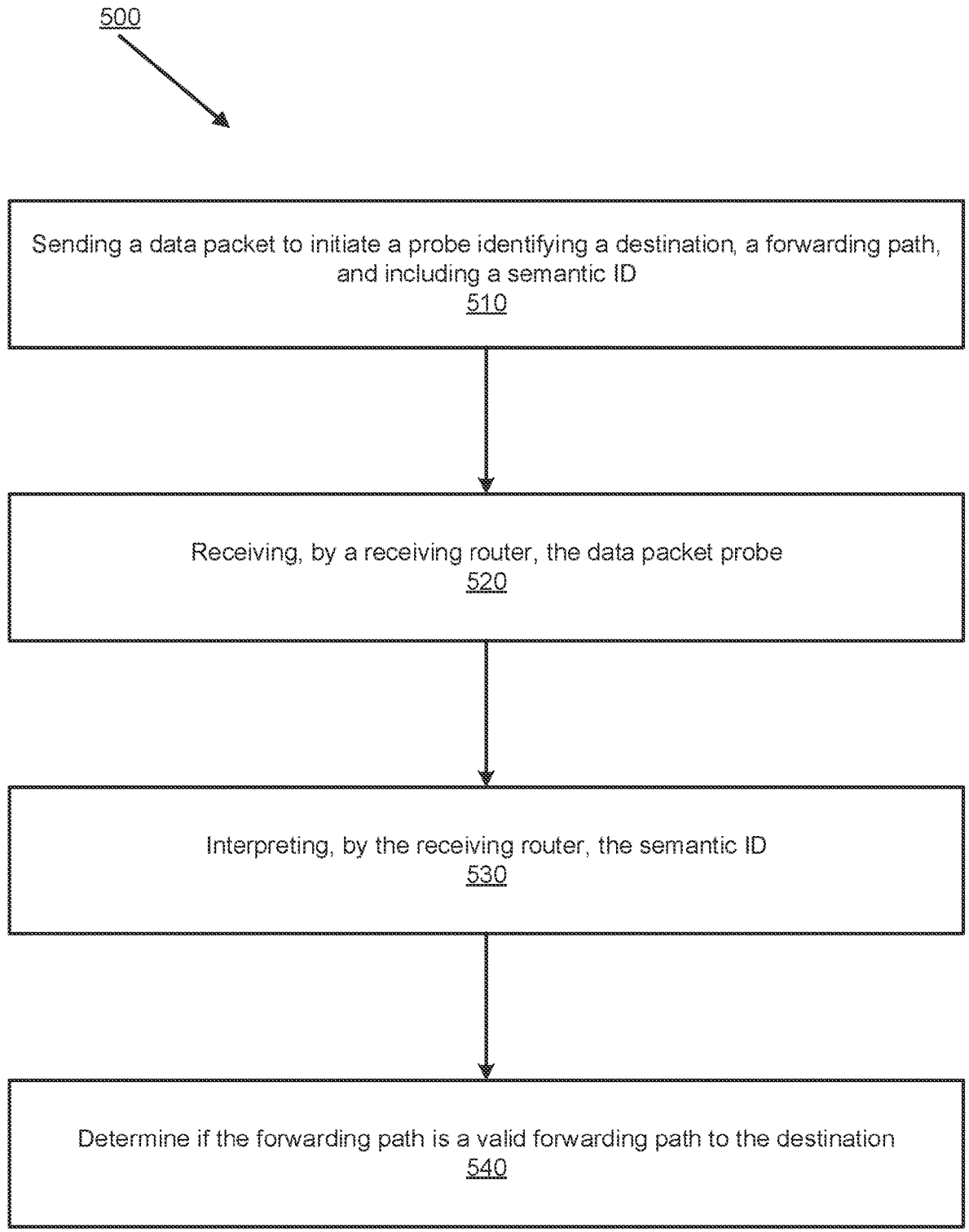
FIG. 5 is a flowchart of a method in accordance with some embodiments of the present technology.

FIG. 5 illustrates an example method 500 which can be carried out by the system illustrated in FIG. 1B. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

In some embodiments, the method includes sending a data packet to initiate a probe identifying a destination and including a segment ID at step 510. For example, initiating device 170 may send a data packet to initiate a probe identifying a destination, a forwarding path, and including a segment ID. In a first example, the segment ID maps to a first interpretation by a receiving router to perform an action on the data packet probe to rewrite a portion of a destination address in a header of the data packet probe, and to redirect the data packet probe to the network device that initiated the probe. In some examples, initiating device 170 can be an OAM server.

In some embodiments, the method includes receiving, by the receiving router, the data packet probe at step 520. For example, router 160-3 may receive the data packet probe.

In some embodiments, the method includes interpreting, by the receiving router, the segment ID at step 530. For example, router 160-3 may interpret the segment ID. In a first example, interpreting the segment ID involves matching a next hop router in an ECMP path forwarding table.

In some embodiments, the method includes determining if the forwarding path is a valid forwarding path to the destination at step 540. For example, router 160-3 may determine if the forwarding path is a valid forwarding path to the destination. In a first example, determining if the forwarding path is a valid forwarding path to the destination includes determining if the next hop router matches the ECMP path forward table.

Figure 6:
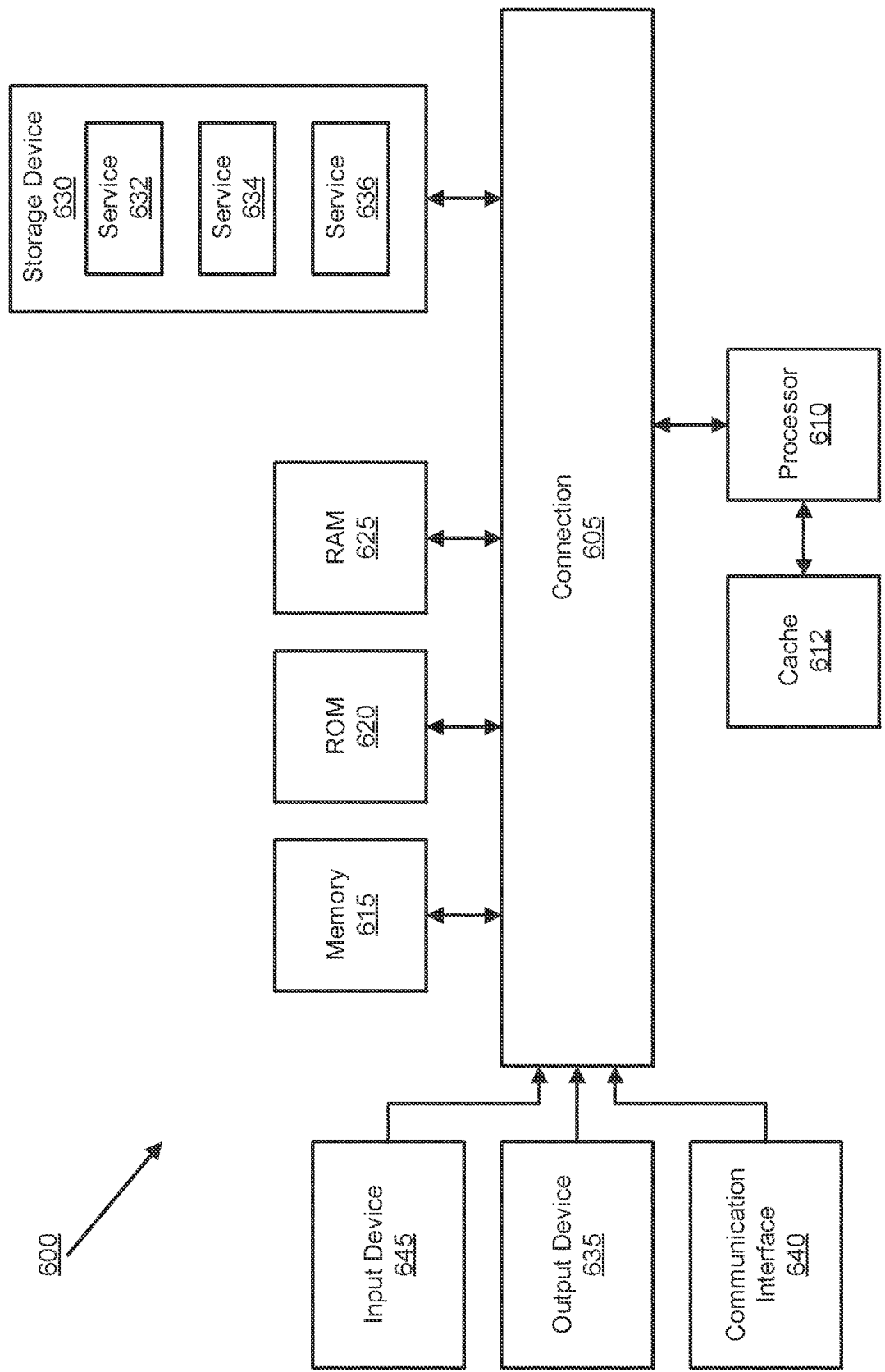
FIG. 6 shows an example of computing system 600, which can be for example any computing device that can implement components of the system in accordance with some embodiments of the present technology.

FIG. 6 shows an example of computing system 600, which can be for example any computing device making up initiating router 110, routers 120 and 160, initiating device 170, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments computing system 600 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example computing system 600 includes at least one processing unit (CPU or processor) 610 and connection 605 that couples various system components including system memory 615, such as read only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method for validating data in a data structure used for forwarding packets by a network device comprising:
    sending a data packet probe identifying a destination and including a segment ID, wherein the segment ID maps to a first interpretation by a receiving router to perform an action on the data packet probe to rewrite a portion of a destination address in a header of the data packet probe, and to redirect the data packet probe to the network device that initiated the data packet probe;
    wherein the segment ID is an embedded segment ID, wherein the embedded segment ID is a portion of the destination address which maps to a semantic meaning in a data structure used for forwarding packets by the receiving router;
    wherein the embedded segment ID includes a plurality of nested embedded segment IDs, wherein each of the plurality of nested embedded segment IDs is interpretable by at least one router along a forwarding path to the destination, and wherein at least one of the plurality of nested embedded segment IDs maps to a second interpretation that is different than the first interpretation for another of the plurality of nested embedded segment IDs.

2. The method of claim 1, wherein the second interpretation of the at least one of the plurality of nested embedded segment IDs instructs a first router to remove a first one of the plurality of nested embedded segment IDs and use a specified byte range located in the destination address in the header of the data packet probe to forward the data packet probe, and to rewrite the destination address in the header of the data packet probe without the first one of the plurality of nested embedded segment IDs and without the specified byte range.

3. The method of claim 1, wherein the embedded segment ID is a loopback segment ID, which maps to the first interpretation by the receiving router to rewrite a portion of the destination address in the header of the data packet probe, and to redirect the data packet probe to its source using an interface from which the data packet probe was received, wherein the source is a router from which the data packet probe was directly received.

4. The method of claim 3, wherein the network device is an initiating router, and wherein the data structure is a routing table for the initiating router, wherein the embedded segment ID can include a plurality of nested embedded segment IDs where each of the plurality of nested embedded segment IDs pertains to information derived from the routing table for the initiating router, wherein the loopback segment ID is used to validate a prefix in the routing table.

5. The method of claim 4, wherein the initiating router is the network device that initiates the data packet probe to validate data in the routing table for the initiating router.

6. The method of claim 4, whereby the prefix is validated because the prefix was used by the initiating router to forward the data packet probe toward a destination prefix, and the data packet probe was returned to the initiating router from a router that is on a path to the destination address that is downstream from the initiating router, which serves as a confirmation that the routing table correctly indicated a proper downstream router on the path to the destination address.

7. The method of claim 3, wherein the network device is an initiating router, and wherein the data structure is a routing table for the initiating router, wherein the embedded segment ID can include a plurality of nested embedded segment IDs where each of the plurality of nested embedded segment IDs pertains to information derived from the routing table for the initiating router, wherein the loopback segment ID is used to validate a next hop in the routing table.

8. The method of claim 7, whereby the next hop in the routing table is validated because the data packet probe was returned by the next hop indicated in the routing table and was received on an interface that the initiating router used to forward the data packet probe to the next hop.

9. The method of claim 1, wherein the network device is an OAM server, and wherein the data structure is an ECMP path forwarding table, wherein the data packet probe identifies the destination and a forwarding path, and wherein the first interpretation further causes the receiving router to determine if the forwarding path is a valid forwarding path to the destination, and when the forwarding path is a valid forwarding path to the destination, redirect the data packet probe over the forwarding path and to the OAM server, else drop the data packet probe.

10. The method of claim 1, wherein the network device is an OAM server, and wherein the data structure is an ECMP path forwarding table, wherein the data packet probe identifies the destination and a forwarding path, and wherein the first interpretation further causes the receiving router to determine if the forwarding path is a valid forwarding path to the destination, and when the forwarding path is a valid forwarding path to the destination, redirect the data packet probe over the forwarding path and to the OAM server, else drop the data packet probe.

11. A system comprising:
a storage configured to store instructions; and
a processor configured to execute the instructions and cause the processor to:
send a data packet probe identifying a destination and including a segment ID, wherein the segment ID maps to a first interpretation by a receiving router to perform an action on the data packet probe to rewrite a portion of a destination address in a header of the data packet probe, and to redirect the data packet probe to a network device that initiated the data packet probe;
wherein the segment ID is an embedded segment ID, and wherein the embedded segment ID is a portion of the destination address which maps to a semantic meaning in a data structure used for forwarding packets by the receiving router;
wherein the network device is an OAM server, and, wherein the data packet probe identifies the destination and a forwarding path, and wherein the first interpretation further causes the receiving router to determine if the forwarding path is a valid forwarding path to the destination, and when the forwarding path is a valid forwarding path to the destination, redirect the data packet probe over the forwarding path and to the OAM server, else drop the data packet probe.

12. The system of claim 11, wherein the network device is an OAM server, and, wherein the data packet probe identifies the destination and a forwarding path, and wherein the first interpretation further causes the receiving router to determine if the forwarding path is a valid forwarding path to the destination, and when the forwarding path is a valid forwarding path to the destination, redirect the data packet probe over the forwarding path and to the OAM server, else drop the data packet probe.

13. A non-transitory computer-readable medium comprising instructions, the instructions, when executed by a computing system, cause the computing system to:
send a data packet probe identifying a destination and including a segment ID, wherein the segment ID maps to a first interpretation by a receiving router to perform an action on the data packet probe to rewrite a portion of a destination address in a header of the data packet probe, and to redirect the data packet probe to a network device that initiated the data packet probe;
wherein the segment ID is an embedded segment ID, and wherein the embedded segment ID is a portion of the destination address which maps to a semantic meaning in a data structure used for forwarding packets by the receiving router;
wherein the network device is an OAM server, and, wherein the data packet probe identifies the destination and a forwarding path, and wherein the first interpretation further causes the receiving router to determine if the forwarding path is a valid forwarding path to the destination, and when the forwarding path is a valid forwarding path to the destination, redirect the data packet probe over the forwarding path and to the OAM server, else drop the data packet probe.

14. The computer-readable medium of claim 13, wherein the network device is an OAM server, and, wherein the data packet probe identifies the destination and a forwarding path, and wherein the first interpretation further causes the receiving router to determine if the forwarding path is a valid forwarding path to the destination, and when the forwarding path is a valid forwarding path to the destination, redirect the data packet probe over the forwarding path and to the OAM server, else drop the data packet probe.

* * * * *